(12) United States Patent
Jarchafjian et al.

(10) Patent No.: US 10,505,907 B2
(45) Date of Patent: Dec. 10, 2019

(54) SECURELY RECOGNIZING MOBILE DEVICES

(71) Applicant: Disney Enterprises, Inc., Burbank, CA (US)

(72) Inventors: Harout Jarchafjian, Glendale, CA (US); Thomas Carey Arthur, Los Angeles, CA (US); Scott Frazier Watson, Marina del Rey, CA (US); Joshua Benjamin Gorin, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 165 days.

(21) Appl. No.: 15/584,812

(22) Filed: May 2, 2017

(65) Prior Publication Data

US 2018/0324152 A1    Nov. 8, 2018

(51) Int. Cl.
| | | |
|---|---|---|
| *H04L 29/06* | (2006.01) | |
| *H04W 12/08* | (2009.01) | |
| *H04W 4/02* | (2018.01) | |
| *H04W 12/00* | (2009.01) | |
| *G06F 21/44* | (2013.01) | |
| *H04W 84/18* | (2009.01) | |
| *H04W 4/80* | (2018.01) | |
| *H04W 12/10* | (2009.01) | |

(52) U.S. Cl.
CPC .......... *H04L 63/0428* (2013.01); *G06F 21/44* (2013.01); *H04L 63/126* (2013.01); *H04W 4/023* (2013.01); *H04W 12/00503* (2019.01); *H04W 12/08* (2013.01); *H04L 63/101* (2013.01); *H04M 2203/6072* (2013.01); *H04W 4/80* (2018.02); *H04W 12/1008* (2019.01); *H04W 84/18* (2013.01)

(58) Field of Classification Search
CPC . H04L 63/0428; H04L 63/083; H04L 63/123; H04W 12/04; H04W 12/08; G06F 21/35
See application file for complete search history.

(56) References Cited

U.S. PATENT DOCUMENTS

| | | | | |
|---|---|---|---|---|
| 2004/0235420 | A1* | 11/2004 | Miyazaki | A63F 13/06 455/41.2 |
| 2014/0105396 | A1* | 4/2014 | Engelien-Lopes | H04W 12/04 380/270 |
| 2015/0302500 | A1* | 10/2015 | Koch | G06Q 30/0623 705/26.61 |
| 2018/0288068 | A1* | 10/2018 | Poliashenko | H04L 63/123 |

* cited by examiner

*Primary Examiner* — Joshua D Taylor
(74) *Attorney, Agent, or Firm* — Patterson + Sheridan, LLP (57) ABSTRACT

Systems, methods and articles of manufacture to perform an operation comprising receiving, from one of a plurality of stations, a message which includes at least a random number and a first hash value of the random number concatenated with a first key, comparing the first hash value to one or more second hash values, wherein each second hash value is generated by hashing the random number concatenated with one of a plurality of second keys and wherein each second key corresponds to a registered device of a device identification system, upon determining the first hash value matches one of the second hash values, determining an identity of the mobile device based on the corresponding second key, and based on the location of the station which sent the message, assigning a location to the mobile device.

21 Claims, 7 Drawing Sheets

SECURELY RECOGNIZING MOBILE DEVICES

BACKGROUND

Field of the Invention

Embodiments presented herein generally relate to techniques for permission-based recognition of a mobile device while protecting an identity of a user of the mobile device. More specifically, embodiments presented herein relate to techniques that allow a mobile device to be recognized by a trusted third-party while preventing a non-trusted third-party from recognizing the mobile device.

Description of the Related Art

A variety of technologies can be used to recognize a mobile device using signals emitted from the device. The signals contain data such as a user ID, device ID and/or address that can be used to recognize the device. However, these technologies allow a non-trusted third-party to also recognize the device if the non-trusted third party can receive and understand the transmitted data. For example, a mobile application may use a static encryption key that is common across all instances of the mobile application to encrypt a transmitted device ID. In that case, the device ID of each mobile device with the application is encrypted using the same encryption key. While this technique may initially be secure, a non-trusted third-party could decompile the application to determine the encryption key. The third-party could then use the encryption key to decrypt any device ID related to that mobile application and recognize the mobile device or a user of the mobile device even though third-party recognition was not intended by the application or the user.

Smartphones functioning as Bluetooth® Low Energy (BLE) peripherals broadcast advertisement messages that contain an address of the smartphone. However, the address of the smartphone is not useful for identification except to a receiving BLE station that has previously bonded with that smartphone because bonding creates a persistent security relationship between the smartphone and the BLE station that enables the encrypted communication between the station and the smartphone. When a BLE station first attempts to bond with the smartphone, a prompt is displayed to the user who must approve or reject the bonding. This prompt could confuse or otherwise disrupt a user experience, and is not desirable for many applications. Existing encryption techniques are incompatible with BLE packet size constraints or require static encryption keys that could be extracted and used by a non-trusted third-party to recognize the smartphone. Thus, alternative means need to be employed.

SUMMARY

In one embodiment, a method of recognizing a mobile device comprises receiving, from one of a plurality of stations, a message which includes at least a random number and a first hash value of the random number concatenated with a first key, comparing the first hash value to one or more second hash values, wherein each second hash value is generated by hashing the random number concatenated with one of a plurality of second keys and wherein each second key corresponds to a device registered with a device identification system, upon determining the first hash value matches one of the second hash values, determining an identity of the user of the mobile device based on the corresponding second key, and based on the location of the station which sent the message, assigning a location to the mobile device associated with the registered device.

In another embodiment, a computer program product comprises a computer readable storage medium having computer-readable program code embodied therewith, the computer-readable program code executable by a processor to perform an operation comprising receiving, from one of a plurality of stations, a message which includes at least a random number and a first hash value of the random number concatenated with a first key, comparing the first hash value to one or more second hash values, wherein each second hash value is generated by hashing the random number concatenated with one of a plurality of second keys and wherein each second key corresponds to a device registered with a device identification system, upon determining the first hash value matches one of the second hash values, determining an identity of the user of the mobile device based on the corresponding second key, and based on the location of the station which sent the message, assigning a location to the mobile device associated with the registered device.

In another embodiment, a system comprises one or more a processors and a memory hosting a program which when executed by the processors, performs an operation comprising receiving, from one of a plurality of stations, a message which includes at least a random number and a first hash value of the random number concatenated with a first key, comparing the first hash value to one or more second hash values, wherein each second hash value is generated by hashing the random number concatenated with one of a plurality of second keys and wherein each second key corresponds to a device registered with a device identification system, upon determining the first hash value matches one of the second hash values, determining an identity of the user of the mobile device, and based on the location of the station which sent the message, assigning a location to the mobile device associated with the registered device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments presented herein provide techniques for recognizing a mobile device by a trusted party with permission while preventing non-trusted third-parties from recognizing that mobile device. Recognizing a mobile device and not just locations of a mobile device (e.g., to identify traffic patterns) can be used for a variety of applications. For example, a sports arena operator could use an identity and a location of a mobile device to link a photograph with a user, provide custom audio for an arena attraction, and better monitor queue wait times. Advantageously, embodiments presented herein allow a user to explicitly give permission to a trusted party to recognize a mobile device of the user for delivery of value-added services, while ensuring that other non-trusted third-parties cannot recognize that device.

In one embodiment, a first party recognizes a mobile device using a wireless protocol, such as Bluetooth® Low Energy (BLE), while preventing third-parties from also recognizing the mobile device by eavesdropping messages exchanged using the wireless protocol. Note, Bluetooth® Low Energy (BLE) is discussed as a reference example, and one of ordinary skill would recognize that any wireless protocol, including a proprietary protocol, that provides features of BLE used in this application could be used. Bluetooth® is a registered trademark of the Bluetooth Special Interest Group.

In one embodiment, a user gives explicit permission to a trusted party by downloading a mobile application and using the application to login to a user account. Once logged in, the application obtains a key value representing a user from a server corresponding to that user account. The key value is used to recognize a particular user relative to other users that have created a user account and registered their mobile device with a device identification system. The application also obtains a shared key from the server. The shared key, generated by the server, has a fixed bit length (e.g., 128 bits) and is associated with the key value. Each time the user logs into their user account, the server generates a new shared key that is associated with the key value representing that user. The application stores the key value and the shared key on the mobile device.

Once the application receives the shared key and key value, the application broadcasts an advertisement using the wireless protocol. For example, a user may log into their account using the application and enter a sports arena with their mobile device. The application then broadcasts an advertisement message. The advertisement is received by a receiving device that listens for such broadcasts. For example, stationary receiving BLE stations may be dispersed throughout the sports arena and scan for advertisements from applications on mobile devices within the sports arena.

When an advertisement from a mobile device is received, the BLE station requests to read a secret value from the application. The secret value is unique to that mobile device and unique to the key value associated with the mobile device. In response to the request, the application on the mobile device generates the secret value. The secret value includes two parts, a random number and a signature. The random number is generated by the application and has a fixed bit length (e.g., 16 bits). The signature is a hash of the random number concatenated with the shared key associated the mobile device. The secret value is formed by concatenating the random number with the signature. The application responds to the request by sending the secret value to the BLE station.

To prevent a third-party from recognizing the mobile device or the user of the mobile device based on the response, the response (i.e., the secret value) does not contain a static value. Rather, the response contains a random number so that each response from the application is different from a previous response.

Upon receiving the secret value, the BLE station sends the secret value to a server which extracts the random number. The random number is concatenated with shared keys stored in a server database. A hash of each concatenated number is computed and compared in turn to the signature portion of the received secret value. Once a matching value is found, a key value corresponding to the shared key in the database is recognized as the key value associated with a particular user.

The database may contain a large number of shared keys and corresponding key values for each device with the application installed and registered in the device identification system. Thus, evaluating a hash for each device until a match is found may require a long time to complete. However, the evaluation process can be optimized to decrease the amount of time necessary to locate a matching shared key and recognize the mobile device.

For example, a device monitoring component on the server may receive a notification from the application that the mobile device has entered or is located within a specific area of the sports arena. In that case, a first subset of shared keys to be evaluated includes a shared key associated with each mobile device located within the sports arena. To further optimize the evaluation process, a second subset of shared keys includes shared keys associated with mobile devices that a BLE station has communicated with that day. A third subset of shared keys, smaller than the second subset, includes shared keys associated with mobile devices that have recently been located in an area adjacent to the area of the BLE station. A hash analysis component on the server may begin the evaluation process using the shared keys within the smallest of the three subsets (e.g., the third subset). If a match is not found within that subset, the hash analysis component continues the evaluation process using the shared keys within a larger subset until a match is found.

Note, certain embodiments are described using a device identification system which includes BLE stations deployed to recognize mobile devices located in a sports arena that are registered with the device identification system and have the application installed. As described, the a particular mobile device and a location of that device can be recognized by a party managing the device identification system, but protected from unwanted disclosure to third-parties that could eavesdrop on wireless communications or impersonate a BLE station. However, one of ordinary skill in the art will recognize that the described embodiments are not limited to the reference examples and may be adapted for device identification systems used to recognize a mobile device and a location of that device in a variety of situations.

Advantageously, the disclosed embodiments allow a trusted device to recognize a mobile device, but prevent a third-party from recognizing the device or recognizing the user of the mobile device. Recognizing a particular mobile device may also be used to create an immersive user experience in a sports arena while protecting the identity of the user from non-trusted third-parties.

Note, embodiments of the invention are described below using a Bluetooth® Low Energy (BLE) wireless protocol. One of ordinary skill in the art will recognize that embodiments of the BLE stations described herein may be adapted to work with a variety of wireless protocol. For example, the wireless protocol may include Wi-Fi, LTE, a cellular network, etc.

Figure 1:
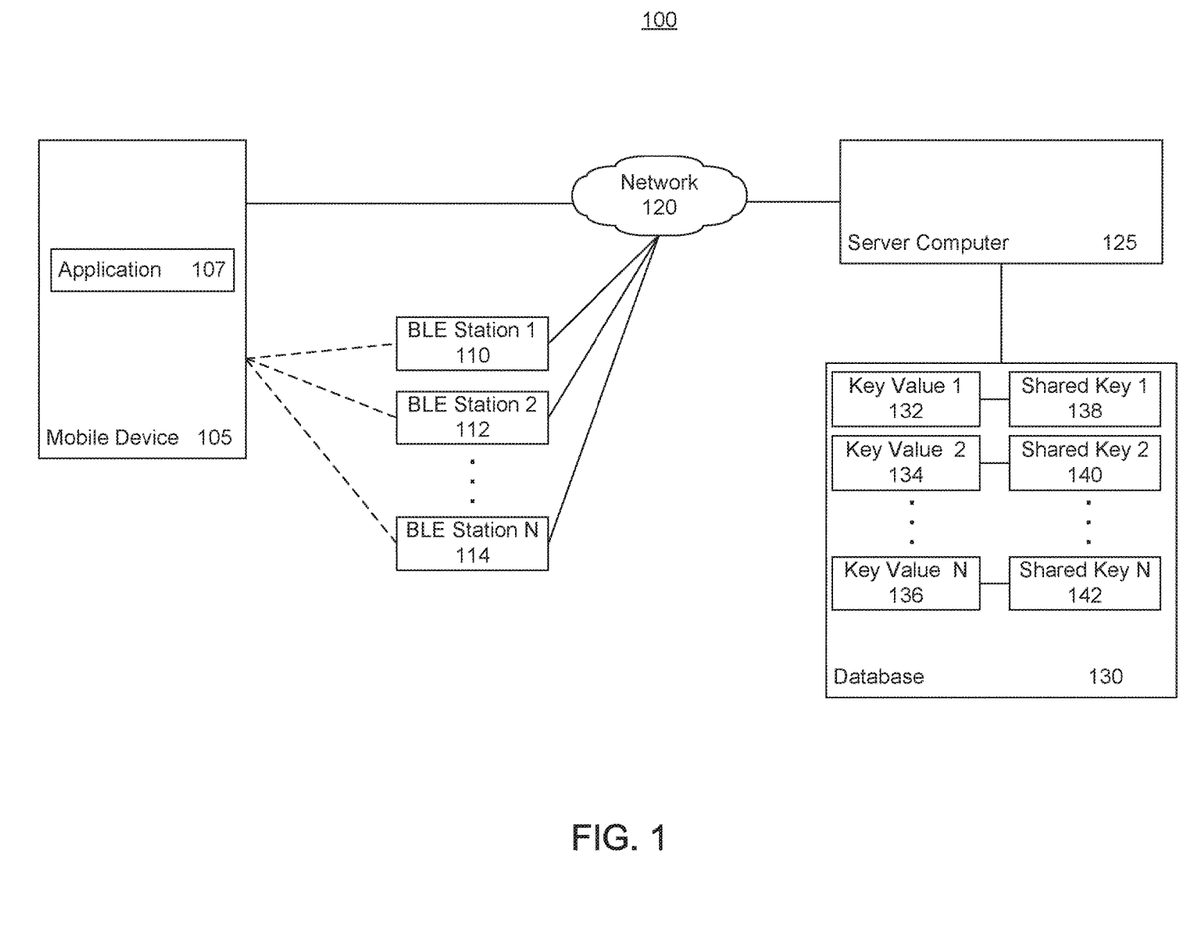
FIG. 1 illustrates a computing environment, according to one embodiment.

FIG. 1 illustrates a computing environment 100, according to one embodiment. As shown, the computing environment 100 includes a mobile device 105, one or more BLE stations 110, 112, 114, a server computer 125 and a database 130, all of which communicate over a network 120.

As shown, mobile device 105 includes a mobile application 107. Once the application 107 is used to create and log into a user account, the application 107 obtains a key value representing the user 132, 134, 136 associated with the account. The application 107 also obtains a shared key that corresponds to the key value 132, 134, 136. The obtained key value 132, 134, 136 and shared key 138, 140, 142 are stored on the mobile device 105 and stored in the database 130. The shared key is be generated by the server 125.

As shown, the database 130 contains a mapping from a key value 132, 134, 136 that represents a user to a shared key 138, 140, 142 for a plurality of mobile devices that have application 107 installed and are registered in a device identification system. In other words, the shared key associated with a given mobile device can be obtained based solely on the key value associated with that device. For example, upon receiving a request to resolve a shared key 138, 140, 142, server computer 125 locates that shared key in database 130 and uses the mapping to determine a corresponding key value 132, 134, 136.

The BLE stations 110, 112, and 114 continuously listen for advertisements from a peripheral device, such as mobile device 105. For example, application 107 broadcasts an advertisement using a wireless protocol. The advertisement includes a Bluetooth® MAC address which may change over time. When a BLE station 110, 112, or 114 detects an advertisement, that BLE station temporality stores the MAC address and signal strength of the advertisement as well as a current time. The BLE station 110, 112, or 114 that detects the advertisement also requests to read a value from the peripheral device.

Upon receiving a request which contains an application ID of application 107 from a BLE station 110, 112, 114, the application 107 generates a secret value using the shared key 138, 140, 142 obtained from the server. The secret value includes a random number generated by the application 107 and a signature. In one embodiment, the signature is a hash of the random number concatenated with the shared key 138, 140, 142 corresponding to the user account. To generate the secret value, the random number is concatenated with the signature. The application 107 returns the secret value to the BLE station 110, 112, 114 where the request originated.

If the mobile device 105 that received the request from the BLE station 110, 112, 114 for the secret value does not have the application 107 installed, the requesting BLE station may not receive a response or the response may result in an error. In that case, the BLE station sends an additional request to the mobile device 105 to see if a response is received. After a few repeated attempts with no response, the MAC address of the mobile device 105 is blacklisted so BLE stations 110, 112, and 114 no longer communicate with that mobile device 105 in response to advertisements broadcast by the mobile device 105.

In one embodiment, the response sent to the BLE station 110, 112, 114 is formatted to a fixed bit length (e.g., 128 bits). The fixed bit length of the response allows communication between the BLE station and mobile device to occur in a single request and single response cycle. The application 107 may truncate the secret value to the fixed bit length before sending the response. For example, if the response is limited to 128 bits, the random number is 16 bits, and the signature is 128 bits, the application 107 truncates the last 16 bits of the signature so the response is 128 bits (e.g., the random number is the first 16 bits of the response and the signature is the next 112 bits). Upon receiving the response from application 107, the BLE station 110, 112, 114 that received the response sends the secret value to the server computer 125 along with a request for the server 125 to resolve the secret value to a key value 132, 134, 136.

Upon receiving the secret value, the server computer 125 extracts the random number. For example, if the random number is 16 bits, the server computer 125 extracts the first 16 bits of the secret value. To recognize the key value 132, 134, 136 associated with the mobile device 105, the server computer 125 computes a hash of the random number concatenated with each of the shared keys 138, 140, 142 stored in database 130. The hash corresponding to each shared key 138, 140, 142 is compared to the received signature to determine a match. If the signature was truncated, the computed hash corresponding to a given shared key in the database may be longer than the signature. In that case, the computed hash is truncated to the same length as the signature. If the computed hash is not truncated, the server compares a number of bits of the computed hash that is equal to a length of the signature to determine if the two values match.

Once a match is found, the shared key 138, 140, 142 used to calculate the matching hash is mapped in the database 130 to the key value 132, 134, 136. The key value is also sent to other devices authorized to recognize the mobile device 105 and a location of the mobile device 105. For example, the shared key may be sent to a device monitoring component on a server to recognize the location of the corresponding mobile device.

Figure 2:
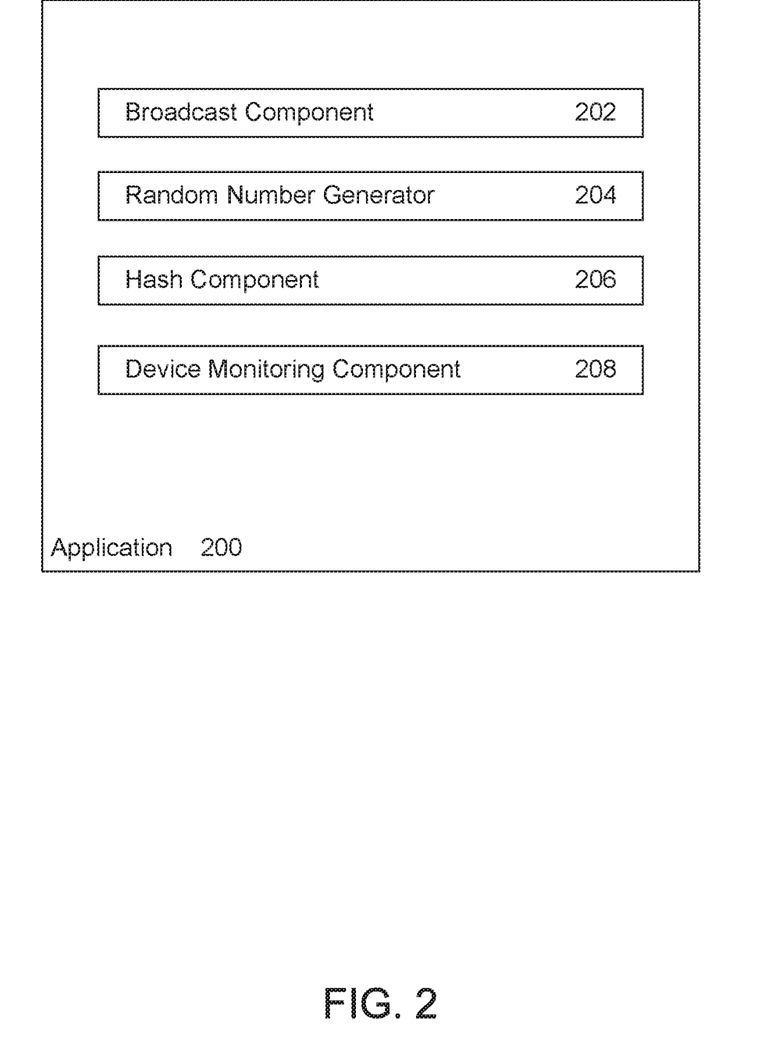
FIG. 2 illustrates an application on a mobile device configured to generate a secret value for a particular user, according to one embodiment.

FIG. 2 illustrates an application 200 on a mobile device configured to generate a secret value for a particular mobile device, according to one embodiment. As shown, application 200 includes a broadcast component 202, a random number generator 204, and a hash component 206.

The broadcast component 202 periodically transmits an advertisement. In one embodiment, the advertisement is broadcast using a standardized wireless protocol, e.g., Bluetooth® Low Energy (BLE). The advertisement generally contains an application ID (i.e., a universally unique identifier (UUID) of a generic attribute (GATT) characteristic) associated with the application 200, and a MAC address of a transceiver on the mobile device. The application ID is a static value that is the same for each instance of the application 200 and has a fixed bit length (e.g., 128 bits). As is known, the MAC address may periodically change over time. Thus, a third-party could not use solely the MAC address to recognize a particular mobile device. Also, because each device with application 200 installed shares the same application ID, a third-party could not distinguish between multiple mobile devices based solely on the application ID. Thus, a third-party could not recognize a mobile device based on an advertisement containing the application ID and a MAC address of the transceiver. Rather, the third-party would recognize that a mobile device with application 200 installed is broadcasting an advertisement.

When application 200 receives a request containing the application ID of application 200 from a BLE station, hash component 206 obtains a random number from random number generator 204 and obtains a shared key associated with the key value received when the user logged into the user account. Hash component 206 generates a signature by computing a hash of the random number concatenated with the shared key. Hash component 206 generates a secret value by concatenating the random number with the signature. Hash component 206 communicates the secret value to the BLE station where the request originated.

For example, a broadcast component 202 of an application 200 on a mobile device may broadcast an advertisement as the device enters an association area near a BLE station. Upon detecting an advertisement from the mobile device, the BLE station requests to read a value based on the UUID of the application 200. The application 200 generates and responds to the BLE station with a secret value.

Figure 3:
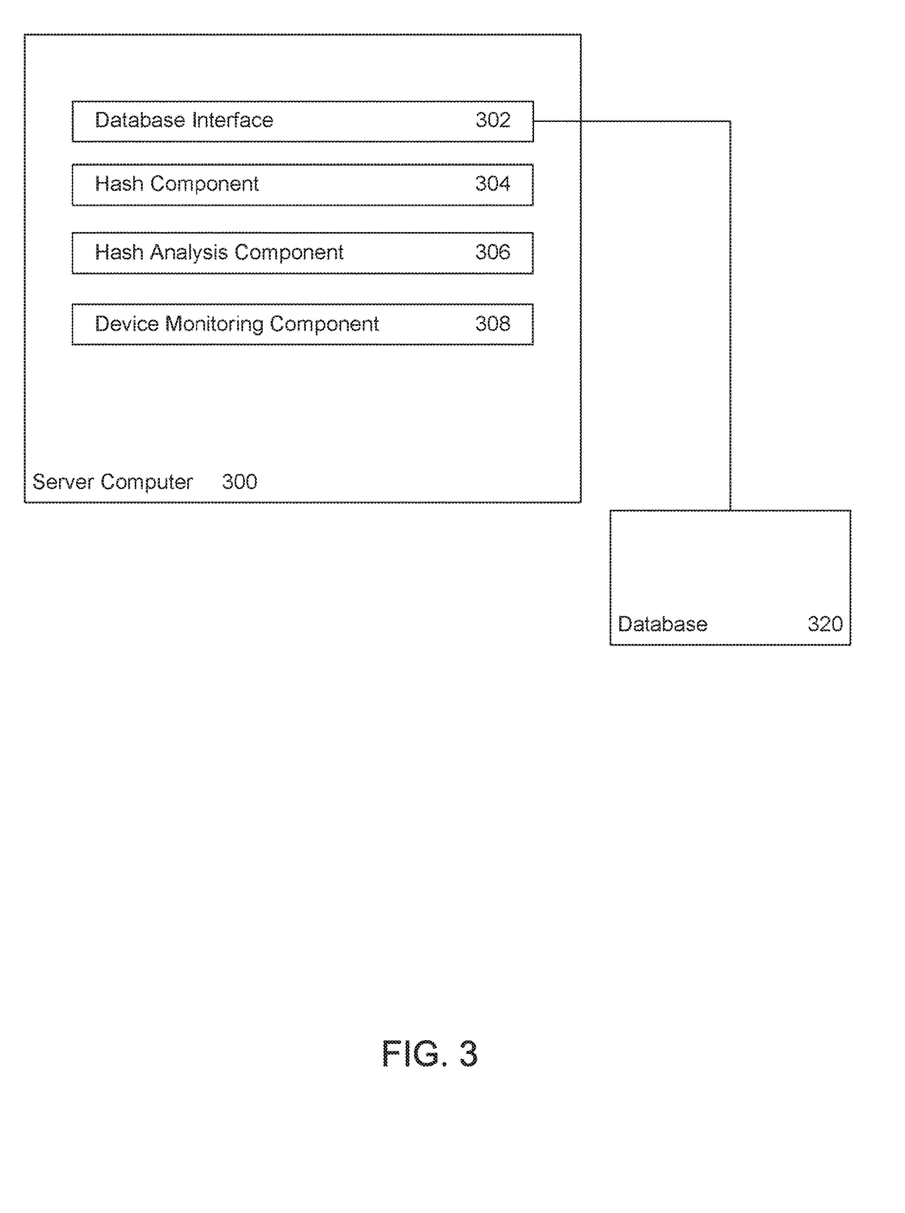
FIG. 3 illustrates a server computer configured to recognize a mobile device, according to one embodiment.

FIG. 3 illustrates a server computer 300 configured to recognize a mobile device, according to one embodiment. As shown, server computer 300 includes a database interface 302, a hash component 304, a hash analysis component 306 and a device monitoring component 308. The server computer 300 communicates with a database 320 using the database interface 302. The database 320 stores a plurality of key values and corresponding shared keys.

Upon receiving a secret value from a mobile device, a BLE station sends the secret value to server computer 300 with a request to resolve that secret value. In response, the server computer 300 resolves the secret value into a corresponding key value which allows the server computer 300 to recognize the mobile device and determine a current location of that mobile device. The server computer 300 extracts the random number from the secret value. The signature comprises the remaining bits of the secret value. For example, if the secret value has a bit length of 128 bits and the random number has a bit length of 16 bits, the last 112 bits of the secret value are the signature.

The hash component 304 determines a hash of the random number concatenated with each shared key stored in the database 320. As noted, the shared keys are distinct for each device registered in the device identification system and are generated when a given user installs the application on a mobile device in order to participate in the device identification system. The hash analysis component 306 compares the hash values, computed using the random number and one of the shared keys in database 320, to the received signature. If the signature and computed hash do not match, hash analysis component 306 computes a hash using the next shared key in the database 320. If the signature matches the computed hash, the shared key used to compute that hash is mapped to the corresponding key value in database 320. The hash analysis component 306 then recognizes the mobile device that sent the secret value, based on the key value that corresponds to the shared key used to compute the matching hash, as the mobile device that sent the secret value. In addition, a location of the device is inferred by a location of the BLE station that requested and obtained the secret value from the mobile device.

Upon recognizing the mobile device and a location of that device, the hash analysis component sends the shared key corresponding to that device and the location to the device monitoring component 308. The device monitoring component 308 analyzes historical data for that device or sends a notification to a trusted device near the location of the mobile device. For example, if a photographer recently took a picture and the location of the device is near a location of the photographer, the key value associated with that device may be provided to the photographer or automatically linked to the photograph.

Figure 4:
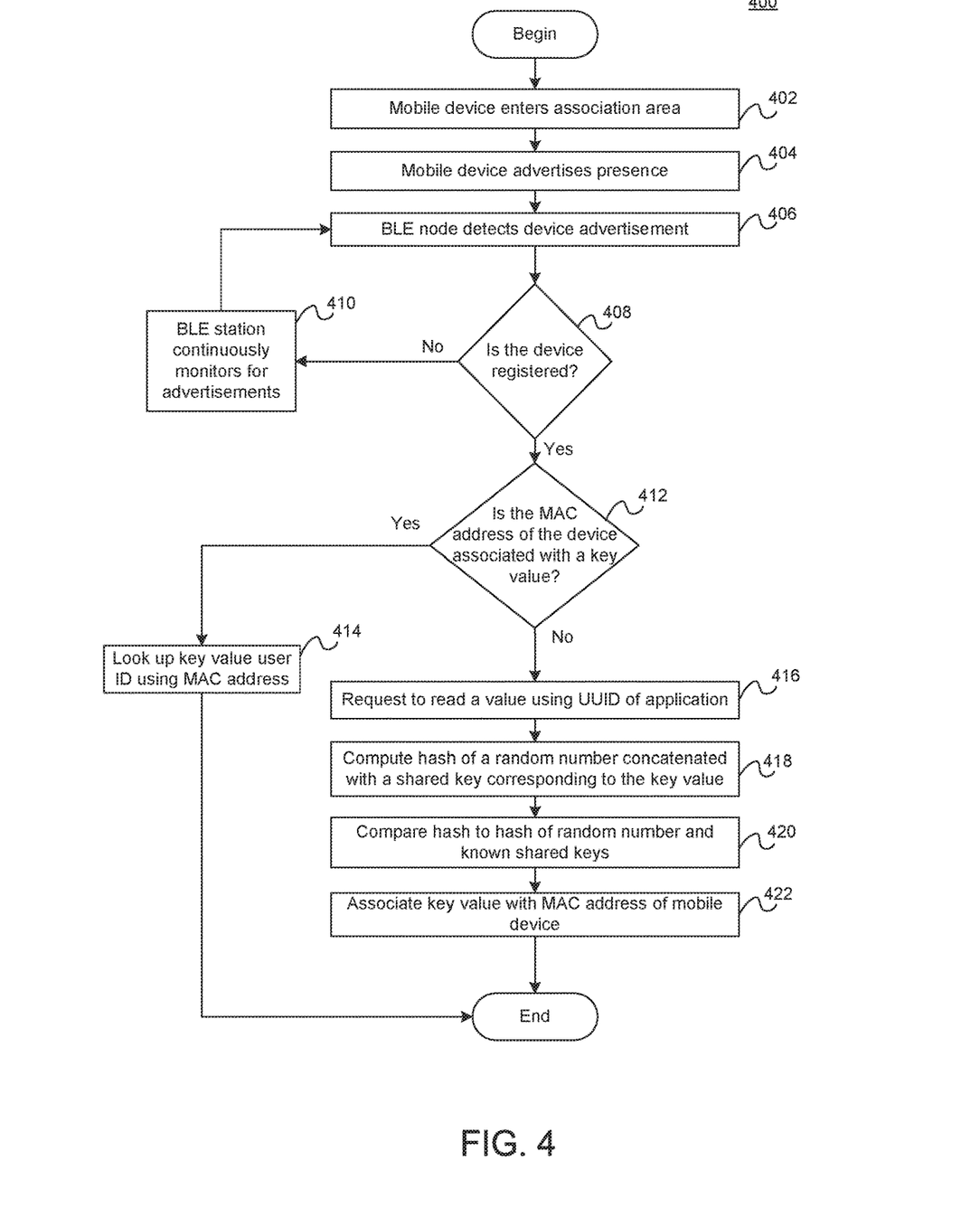
FIG. 4 illustrates a method to associate a mobile device with a corresponding user, according to one embodiment.

FIG. 4 illustrates a method 400 to associate a mobile device with a corresponding user, according to one embodiment. As shown, the method begins at step 402, where a device participating in the device identification system enters an association area near one or more BLE stations. For example, a user in possession of a mobile device may enter a sports arena and enter an area within range of a deployed set of BLE stations. At step 404, the mobile device broadcasts an advertisement using a BLE protocol. For example, an application on a mobile device broadcasts an advertisement which contains a MAC address of the device that changes periodically over time and an application ID of an application executing on the mobile device.

At step 406, a BLE station detects the advertisement from the mobile device. For example, a BLE advertisement from a mobile device may be detected by a BLE station that listens for such advertisements when the mobile device is within range of the BLE station (e.g., typically less than 50 meters). At step 408, the BLE station determines if the advertisement came from a mobile device associated with a particular shared key. That is, the BLE station determines whether the application is installed on the mobile device, the user of that device has logged into a user account, and the device is registered to participate in the device identification system. If not, the BLE station ignores that advertisement and monitors for other advertisements at step 410.

If the mobile device is registered to participate in the device identification system, the BLE station temporarily stores the MAC address of the mobile device and sends a request to a server computer to determine if the MAC address is associated with a key value at step 412. If so, at step 414, the server sends the key value to a device monitoring component or other trusted device to identify the location of the user and mobile device. If the MAC address of the mobile device is not associated with a key value, the BLE station requests to read a value from the mobile device at step 416. The request contains an application ID of the application on the mobile device. At step 418, if the application ID in the request matches the application ID of the application on the mobile device, the application on the mobile device generates a random number and a signature. The signature is determined by hashing the random number concatenated with the shared key corresponding to the key value received when the user logged into their account. The random number is concatenated with the signature to form a secret value corresponding to the mobile device. The application sends the secret value to the BLE station which sends the secret value to the server. In one embodiment, the application on the mobile device sends the secret value directly to the server.

Upon receiving the secret value, the server resolves the secret value to a key value. Resolving the secret value allows the server to recognize a shared key associated with the mobile device and a current location of the mobile device. To do so, at step 420, the server extracts the random number from the secret value. The server computes a hash of the random number concatenated with each shared key stored in a database, in turn, and compares the resulting hash to the secret value. At step 422, when the resulting hash matches the secret value, the MAC address of the mobile device that sent the secret value is associated in the database with the shared key used to calculate the resulting hash.

Figure 5:
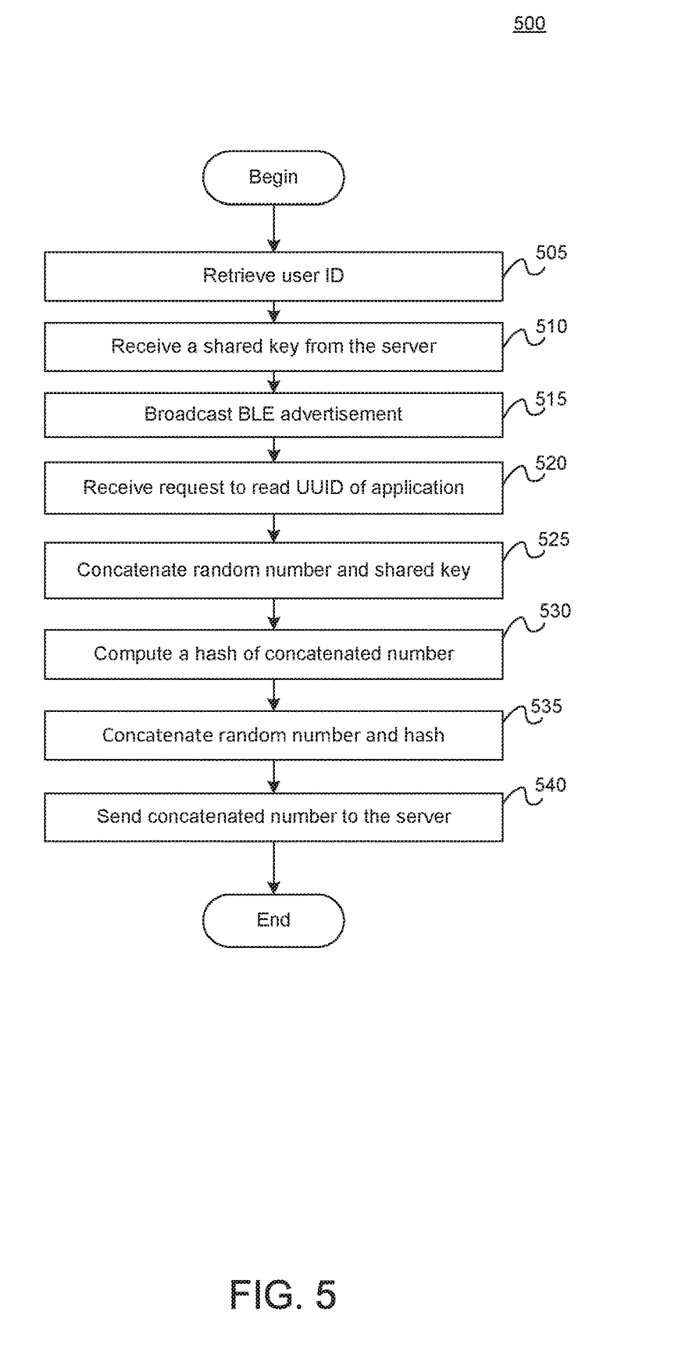
FIG. 5 illustrates a method to generate a secret value used to recognize a mobile device, according to one embodiment.

FIG. 5 illustrates a method 500 to generate a secret value used to recognize a mobile device, according to one embodiment. At step 505, when a user installs the application on their mobile device and initially creates a user account, the application retrieves a key value representing the user from the server and stores that key value on the mobile device. The server generates the key value, stores the key value in the database, and associates the key value with information about the user of the mobile device (e.g., name, address, telephone number, etc.) in the database.

At step 510, when the user logs into their account using the application, the application requests the server to provide a shared key. The server may generate the shared key based on the key value and respond to the request by sending the shared key to the application. The shared key may also be configured in the application when the application is installed on the mobile device. The key value or shared key may be revoked (e.g., after a period of inactivity on the application) and a new key value or shared key associated with the user account. In one embodiment, the key value and shared key are not transmitted between the mobile device and server each time the user logs into their account. Rather, the key value and shared key are transmitted when the user initially logs into the account and when a new key value or shared key is associated with the account. The key value and the shared key are stored on the mobile device and in the database.

At step 515, the application on the mobile device broadcasts an advertisement using the BLE protocol. For example, the application may advertise a presence of the mobile device by broadcasting an advertisement formatted using the Bluetooth® Low Energy protocol. A set of BLE stations within the association area covered by the device identification system listen for advertisements from mobile devices. When a BLE station detects an advertisement, the MAC address from that advertisement is temporarily stored. A signal strength of the advertisement and a current time are also be stored. The BLE station that detects the advertisement sends a request to the mobile device to read a value. Such a request includes the application ID which is used to recognize the application on the mobile device as the intended recipient of the request.

At step 520, the application receives the request from the BLE station that detected the advertisement to read a value. At step 525, a hash component of the application obtains a random number and concatenates the random number with the shared key received when the user logged into the user account. As noted, the shared key may have been stored on the mobile device when the user logged into the user account. At step 530, the hash component generates a signature by computing a hash of the concatenated number. The signature is distinct from and associated with the user account. At step 535, a secret value is generated by concatenating the random number and the signature. Any bit over a maximum length is truncated from the secret value. For example, the application may transmit a maximum of 128 bits. In that case, the first 128 bits of the secret value is transmitted while any remaining bit is truncated. At step 540, the application sends the bits of the secret value that are not truncated to the server.

Figure 6:
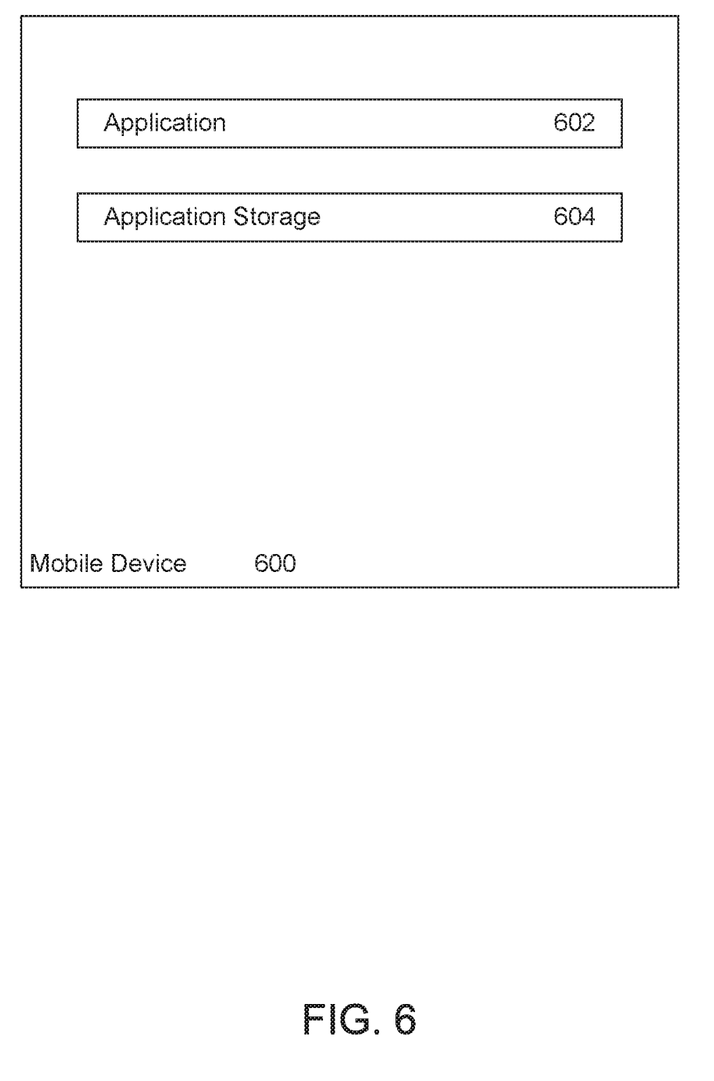
FIG. 6 illustrates a mobile device configured to generate a secret value, according to one embodiment.

FIG. 6 illustrates a mobile device 600 configured to generate a secret value, according to one embodiment. As shown, mobile device 600 includes an application 602 and an application storage 604. The application 602 is used to create or log into a user account. Once logged in, the application 602 obtains a key value and a shared key associated with the device. The application 602 stores the key value and shared key in application storage 604.

Once logged in, the application 602 also determines a current location of the mobile device 600. If the location is near or within a wireless association area, the application 602 broadcasts an advertisement message using a wireless protocol, such as Bluetooth® Low Energy (BLE). For example, a user may log into a user account on their mobile device 600 and enter a sports arena. Once inside, the application 602 broadcasts an advertisement message using BLE. The advertisement message includes an application ID of application 602 and a MAC address of a BLE transceiver on the mobile device 600. One or more BLE stations may be dispersed throughout association areas within the sports arena.

Upon detecting the advertisement, a BLE station in the association area issues a request to the application 602 to read a value. The request includes an application ID to determine whether application 602 is an intended recipient of the request. If the application ID of application 602 matches the application ID in the request, application 602 generates a response to the request. For example, application 602 may obtain a random number and concatenate the random number with the shared key associated with the user. To generate a signature, a hash component of application 602 computes a hash of the concatenated number. A secret value is formed by concatenating the random number with the signature. The secret value is transmitted to the BLE station where the request originated or to a sports arena server.

Figure 7:
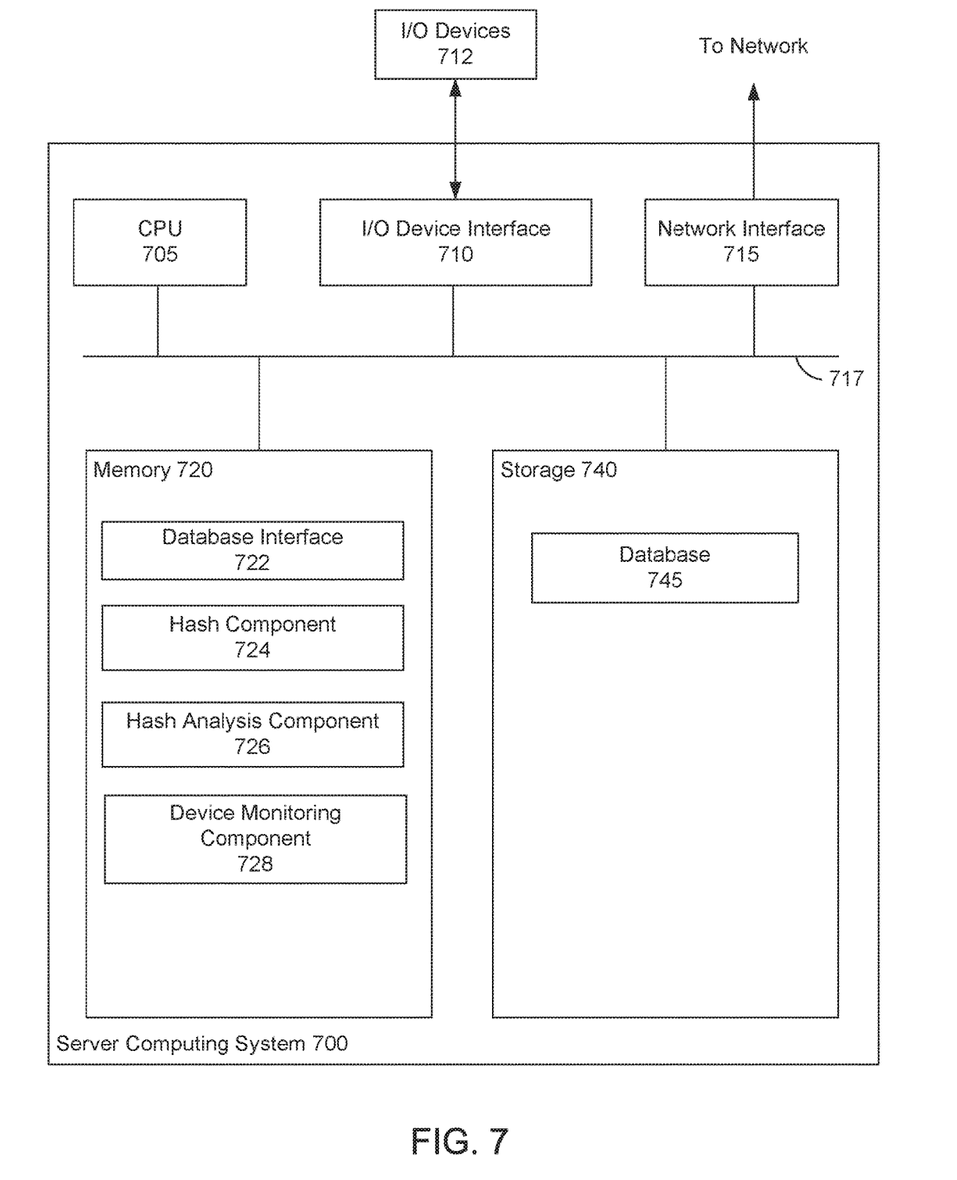
FIG. 7 illustrates a server computing system with a set of software applications used to securely recognize a mobile device, according to one embodiment.

FIG. 7 illustrates a server computing system 700 with a set of software applications used to securely recognize a mobile device, according to one embodiment. As shown, the computing system 700 includes, without limitation, a central processing unit (CPU) 705, a network interface 715, a memory 720, and storage 740, each connected to a bus 717. The computing system 700 also includes an I/O device interface 710 connecting I/O devices 712 (e.g., keyboard, display, mouse devices, image capture devices, etc.) to the computing system 700. Further, the computing elements shown in computing system 700 may correspond to a physical computing system (e.g., a system in a data center) or may be a virtual computing instance executing within a computing cloud.

The CPU 705 retrieves and executes programming instructions stored in the memory 720 as well as stored in the storage 740. The bus 717 is used to transmit programming instructions and application data between the CPU 705, I/O device interface 710, storage 740, network interface 715, and memory 720. Note, CPU 705 is included to be representative of a single CPU, multiple CPUs, a single CPU having multiple processing cores, and the like, and the memory 720 is generally included to be representative of a random access memory. The storage 740 may be a disk drive or flash storage device. Although shown as a single unit, the storage 740 may be a combination of fixed and/or removable storage devices, such as fixed disc drives, removable memory cards, optical storage, network attached storage (NAS), or a storage area-network (SAN).

Illustratively, the memory 720 includes a database interface 722, a hash component 724, a hash analysis component 726, and a device monitoring component 728. As shown, the storage 740 includes a database 745. In certain aspects, these components may correspond to the components of the server computer 300 described with reference to FIG. 3.

For example, upon receiving a secret value from a BLE station or a mobile device, the hash component 724 may extract a random number from the secret value. The remaining portion of the secret value is a signature of the mobile device. The database contains information corresponding to mobile devices, such as shared keys and key values stored associated with the devices. A database entry for a given device may include a key value representing a user, a shared key and information about the user such as an address, a phone number, etc.

Once the random number is extracted from the secret value, the hash component 724 computes a hash of the random number concatenated with a shared key obtained from the database 745. The hash analysis component 726 may truncate the resulting hash. For example, if the received signature is shorter than the resulting hash, the hash analysis component 726 truncates the last bits of the resulting hash so the resulting hash is the same length as the signature. The hash analysis component 726 compares the resulting hash with the received signature.

If the compared values do not match, the hash component 724 computes a new hash of the random number and a different shared key from the database 745. The new hash is compared to the received signature to determine if those values match. Once a matching value is found, the mobile device is recognized as the mobile device that broadcast the advertisement message and the MAC address of the mobile device is associated with the key value used to compute the received signature.

The mobile device and a current location of the mobile device are obtained by the device monitoring component 728. The device monitoring component 728 stores the shared key associated with the mobile device and the location of the mobile device in the database 745. If the location is within a specific association area, the device monitoring component 728 sends a notification to a trusted third-party or a trusted device. For example, if the location of the mobile device is within a specified distance from a photographer in a sports arena, a notification may be sent to the photographer along with key value associated with the mobile device so that the photograph can be linked to that key value.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. In the context of this document, a computer readable storage medium may be any tangible medium that can contain, or store a program for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method of authorized recognition of a mobile device, the computer-implemented method comprising:

receiving, from one station of a plurality of stations, a request to determine whether a media access control (MAC) address of the mobile device is associated with any key value, wherein the request is received by a server operatively connected to the plurality of stations via a network, wherein the request was sent by the one station upon a determination that the mobile device is registered, wherein the determination was made by the one station in response to detection of an advertisement from the mobile device by the one station when the one station was monitoring for advertisements, wherein the advertisement advertises a presence of the mobile device and was transmitted by the mobile device upon the mobile device entering an association area;

determining that the MAC address is not associated with any key value, whereafter an indication that the MAC address is not associated with any key value is sent to the one station, wherein the one station is configured to, upon receiving the indication, request the mobile device to read a value using a universally unique identifier of an application executing on the mobile device, whereupon the mobile device is configured to generate a message specifying at least an identifying value and send the message to the one station, the identifying value including a random number and a signature, the signature comprising a first hash value of a concatenation of the random number with a first key;

receiving the message from the one station, the random number making the mobile device less recognizable via network traffic eavesdropping, across multiple received messages at least relative to a static identifying value being used, wherein the identifying value is distinct across the multiple received messages;

comparing the first hash value to one or more second hash values, wherein each second hash value is generated by hashing a concatenation of the random number with one of a plurality of second keys and wherein each second key corresponds to a registered device;

upon determining the first hash value matches one of the second hash values, recognizing, by operation of one or more computer processors, the mobile device based on the corresponding second key and without requiring network traffic eavesdropping; and assigning a location to the recognized mobile device, based on the location of the one station.

2. The computer-implemented method of claim 1, further comprising:

upon receiving a specified number of errors from the mobile device, placing the mobile device on a blacklist; and preventing communication with the mobile device while it is on the blacklist.

3. The computer-implemented method of claim 1, wherein the mobile device is registered with a device identification system, wherein the mobile device receives the first key when the mobile device is registered, and wherein the registered device is associated with a registered user.

4. The computer-implemented method of claim 1, wherein upon determining, by the one station, that the mobile device is registered and further upon receiving, by the one station and from the server, an indication that the MAC address of the device is already associated with a key value, the server is configured to look up the key value based on the MAC address without causing the mobile device to generate any message that contains any identifying value, wherein each of the first and second keys comprises a respective, shared key, wherein the one station is operatively and wirelessly connected to the mobile device, wherein the network traffic eavesdropping comprises wireless network traffic eavesdropping.

5. The computer-implemented method of claim 4, wherein comparing the first hash value to one or more second hash values comprises sequentially searching successively larger sets of shared keys until a match is found, the successively larger sets of shared keys including (i) a first set consisting of shared keys associated with all mobile devices that have been located in an area adjacent to the one station at a point in time satisfying a predefined recency criterion, (ii) a second set consisting of shared keys associated with all mobile devices that the one station has communicated with during a predefined time period less stringent than the predefined recency criterion, and (iii) a third set consisting of shared keys associated with all mobile devices within a predefined proximity of a specified venue.

6. The computer-implemented method of claim 5, wherein the application includes a broadcast component, a random number generator, a hash component, and a device monitoring component;

wherein the server includes a database interface, a hash component, a hash analysis component, and a device monitoring component;

wherein each of the plurality of stations monitors for advertisements from mobile devices, wherein the advertisement of the mobile device contains the universally unique identifier, wherein the mobile device is registered with a device identification system, wherein the mobile device receives the first key when the mobile device is registered, wherein the registered device is associated with a registered user, wherein the computer-implemented method further comprises:

upon receiving a specified number of errors from the mobile device, placing the mobile device on a blacklist; and preventing communication with the mobile device while it is on the blacklist.

7. The computer-implemented method of claim 1, wherein comparing the first hash value to one or more second hash values comprises sequentially searching successively larger sets of shared keys until a match is found.

8. The computer-implemented method of claim 1, wherein the application includes at least one of a broadcast component, a random number generator, a hash component, and a device monitoring component.

9. The computer-implemented method of claim 1, wherein the server includes at least one of a database interface, a hash component, a hash analysis component, and a device monitoring component.

10. A computer program product for authorized recognition of a mobile device, the computer program product comprising:

a non-transitory computer-readable medium having computer-readable program code embodied therewith, the computer-readable program code executable by one or more computer processors to perform an operation comprising:

receiving, from one station of a plurality of stations, a request to determine whether a media access control (MAC) address of the mobile device is associated with any key value, wherein the request is received by a server operatively connected to the plurality of stations via a network, wherein the request was sent by the one station upon a determination that the mobile device is registered, wherein the determination was made by the one station in response to detection of an advertisement from the mobile device by the one station when the one station was monitoring for advertisements, wherein the advertisement advertises a presence of the mobile device and was transmitted by the mobile device upon the mobile device entering an association area;

determining that the MAC address is not associated with any key value, whereafter an indication that the MAC address is not associated with any key value is sent to the one station, wherein the one station is configured to, upon receiving the indication, request the mobile device to read a value using a universally unique identifier of an application executing on the mobile device, whereupon the mobile device is configured to generate a message specifying at least an identifying value and send the message to the one station, the identifying value including a random number and a signature, the signature comprising a first hash value of a concatenation of the random number with a first key;

receiving the message from the one station, the random number making the mobile device less recognizable via network traffic eavesdropping, across multiple received messages at least relative to a static identifying value being used, wherein the identifying value is distinct across the multiple received messages;

comparing the first hash value to one or more second hash values, wherein each second hash value is generated by hashing a concatenation of the random number with one of a plurality of second keys and wherein each second key corresponds to a registered device;

upon determining the first hash value matches one of the second hash values, recognizing the mobile device based on the corresponding second key and without requiring network traffic eavesdropping; and assigning a location to the recognized mobile device, based on the location of the one station.

11. The computer program product of claim 10, the operation further comprising:

upon receiving a specified number of errors from the mobile device, placing the mobile device on a blacklist; and preventing communication with the mobile device while it is on the blacklist.

12. The computer program product of claim 10, wherein the mobile device is registered with a device identification system, wherein the mobile device receives the first key when the mobile device is registered, and wherein the registered device is associated with a registered user.

13. The computer program product of claim 10, wherein comparing the first hash value to one or more second hash values comprises sequentially searching successively larger sets of shared keys until a match is found.

14. The computer program product of claim 10, wherein the application includes at least one of a broadcast component, a random number generator, a hash component, and a device monitoring component.

15. The computer program product of claim 10, wherein the server includes at least one of a database interface, a hash component, a hash analysis component, and a device monitoring component.

16. A system for authorized recognition of a mobile device, the system comprising:

one or more computer processors; and a memory hosting a program, which, when executed by the one or more computer processors, performs an operation comprising:

receiving, from one station of a plurality of stations, a request to determine whether a media access control (MAC) address of the mobile device is associated with any key value, wherein the system is operatively connected to the plurality of stations via a network, wherein the request was sent by the one station upon a determination that the mobile device is registered, wherein the determination was made by the one station in response to detection of an advertisement from the mobile device by the one station when the one station was monitoring for advertisements, wherein the advertisement advertises a presence of the mobile device and was transmitted by the mobile device upon the mobile device entering an association area;

determining that the MAC address is not associated with any key value, whereafter an indication that the MAC address is not associated with any key value is sent to the one station, wherein the one station is configured to, upon receiving the indication, request the mobile device to read a value using a universally unique identifier of an application executing on the mobile device, whereupon the mobile device is configured to generate a message specifying at least an identifying value and send the message to the one station, the identifying value including a random number and a signature, the signature comprising a first hash value of a concatenation of the random number with a first key;

receiving the message from the one station, the random number making the mobile device less recognizable via network traffic eavesdropping, across multiple received messages at least relative to a static identifying value being used, wherein the identifying value is distinct across the multiple received messages;

comparing the first hash value to one or more second hash values, wherein each second hash value is generated by hashing a concatenation of the random number with one of a plurality of second keys and wherein each second key corresponds to a registered device;

upon determining the first hash value matches one of the second hash values, recognizing the mobile device based on the corresponding second key and without requiring network traffic eavesdropping; and assigning a location to the recognized mobile device, based on the location of the one station.

17. The system of claim 16, wherein the operation further comprises:

upon receiving a specified number of errors from the mobile device, placing the mobile device on a blacklist; and preventing communication with the mobile device while it is on the blacklist.

18. The system of claim 16, wherein the mobile device is registered with a device identification system, wherein the mobile device receives the first key when the mobile device is registered, and wherein the registered device is associated with a registered user.

19. The system of claim 16, wherein comparing the first hash value to one or more second hash values comprises sequentially searching successively larger sets of shared keys until a match is found.

20. The system of claim 16, wherein the application includes at least one of a broadcast component, a random number generator, a hash component, and a device monitoring component.

21. The system of claim 16, wherein the system includes at least one of a database interface, a hash component, a hash analysis component, and a device monitoring component.

* * * * *